United States Patent [19]

Fieberg et al.

[11] 4,105,442
[45] Aug. 8, 1978

[54] SEPARATION AND PURIFICATION OF RUTHENIUM

[75] Inventors: Monika M. Fieberg, Johannesburg; Roderick I. Edwards, Honeydew, both of South Africa

[73] Assignee: The National Institute for Metallurgy, South Africa

[21] Appl. No.: 806,819

[22] Filed: Jun. 15, 1977

[30] Foreign Application Priority Data

Jun. 21, 1976 [ZA] South Africa ............... 76/3680

[51] Int. Cl.$^2$ ................................................. C01G 55/00
[52] U.S. Cl. .................................. 75/101 BE; 423/22
[58] Field of Search ............ 75/101 BE, 121, 97 R; 423/22, 658.5

[56] References Cited

U.S. PATENT DOCUMENTS 2,894,816  7/1959  Hyman et al. ................... 423/22
4,002,470  1/1977  Isa et al. ............................ 75/121

OTHER PUBLICATIONS

Kraak, "Nuclear Science Absts." vol. 14, Jul. 15, 1960, #12643.
Brown et al., "Journal Applied Chem., "Oct. 1960, pp. 422–428.
Sinitzin et al., "Proceedings of International Solvent Extraction Conference, 1974", Soc. of Chemical Industry, London, 1974, vol. 3, pp. 2703–2713.

Primary Examiner—Herbert T. Carter
Attorney, Agent, or Firm—Cushman, Darby & Cushman

[57] ABSTRACT

A process for the separation or purification of ruthenium from solutions thereof comprising conversion of the ruthenium to nitrosylruthenium complex with the ruthenium in the $Ru^{+2}$ oxidation state; conversion of the nitrosylruthenium complex to a nitrosylruthenium chlorocomplex and any other platinum group metals to chlorocomplexes; and the removal of the nitrosylruthenium chlorocomplex from solution using a suitable liquid or resin anion exchanger.

14 Claims, No Drawings

SEPARATION AND PURIFICATION OF RUTHENIUM

BACKGROUND OF THE INVENTION

This invention relates to the separation and purification of ruthenium from its solutions containing other platinum group metals and base metals.

In this specification the term "base metal" refers to any metal other than a member of the platinum group of metals and gold.

Ruthenium is one of the platinum group metals and is usually recovered with the other platinum group metals in the form of a platinum group metals concentrate, wherein the ruthenium concentration is relatively low.

Conventional techniques for the recovery and purification of ruthenium are based on the formation of an oxide which boils at a low temperature relative to many other oxides. Thus ruthenium and osmium tetroxides can be formed by oxidation of the metals in solution, and then removed from solution by boiling.

For osmium, oxidation of the metal to the VIII oxidation state is relatively easy, and a number of oxidising agents can be used. Furthermore, osmium can be efficiently removed as the tetroxide forms even under fairly strongly acid conditions.

For ruthenium however, the oxidation is more difficult and control of the solution pH at a relatively high value is essential. Under these circumstances, removal of ruthenium from solution is incomplete and generally several hundred parts per million of ruthenium remain in the solution.

This not only represents a loss in ruthenium recovery, but the ruthenium remaining forms an impurity element in the further processing of the solution for the recovery of the other platinum group metals.

Other disadvantages occur including the contamination of the ruthenium distillate with an acid spray which is often formed and also the highly unstable nature of ruthenium tetroxide makes it dangerous owing to the possibility of an explosion.

Separation of ruthenium using solvent extraction and ion-exchange methods has not generally proved very successful. An exception may be found in the treatment or radio-active waste materials which contain appreciable concentrations of ruthenium. The usual treatment is by solvent extraction from a nitric acid solution. In such solutions ruthenium occurs as the nitrosylruthenium nitrate complexes which can be separated from the solution by solvent extraction with, typically, long chain tertiary amines.

It is well known that ruthenium forms a very large number of nitrosylruthenium complexes and that the stability of such complexes is greater for ruthenium than for any other element. Thus, for example, in hydrochloric acid solution the nitrosylruthenium complex $RuNOCl_5^{2-}$ can be formed. This complex is highly extractable, and, by forming such a complex preferentially, separation of ruthenium from the other platinum group metals may be achieved. The use of such a process has, however, up to now, been hampered by the following two factors:

1. the available methods of making the nitrosylruthenium complex often have the disadvantage that the reaction yield is not 100%, but typically 90-95%, or, when a quantitative yield is obtainable such available methods are very inconvenient to implement in practice; and, 2. during the course of the reaction the other platinum group metals in solution tend to form complexes, although of a different nature, which behave towards anionic solvent extractants in a manner similar to the nitrosylruthenium complex.

It is an object of this invention to provide a process for the separation and purification of ruthenium as a nitrosylruthenium complex which provides for a high yield of this complex and the formation of the other platinum group metals present into forms suitably different in their behaviour in comparison with the nitrosylruthenium complex.

DETAILED DESCRIPTION OF THE INVENTION

According to the invention a process for the separation or purification of ruthenium from solutions thereof comprising:

conversion of the ruthenium to a nitrosylruthenium complex with the ruthenium in the $Ru^{+2}$ oxidation state; conversion of the nitrosylruthenium complex to a nitrosylruthenium chlorocomplex and any other platinum group metals to chlorocomplexes; and, the removal of the nitrosylruthenium chlorocomplex from solution using a suitable liquid or resin anion exchanger.

Further according to the invention base metals may be present in the initial solution; the only other platinum group metals in the initial solution of significant concentration are iridium and rhodium but others may be present in low concentrations; the conversion to the nitrosylruthenium complex comprises using a suitable reductant to convert the ruthenium to $Ru+^2$ and then heating the solution with an excess of nitric acid under conditions chosen to ensure substantially complete formation of the nitrosylruthenium; the suitable reductant is formic acid or formaldehyde; and the subsequent conversion to the nitrosylruthenium chlorocomplex is accomplished by accidification of the solution and the addition of chloride ions.

Still further according to the invention the ruthenium chlorocomplex is of the form "$RuNOCL_5^{-2}$", the iridium chlorocomplex is of the form $IrCl_6^{-3}$ and the rhodium chlorocomplex is of the form $RhCl_6^{-3}$.

The invention also provides that, where applicable, the anion exchanger be stripped by contacting with an alkali solution the pH of which is sufficiently high to maintain the ruthenium complex in solution and that the resultant strip solution be treated for recovery of ruthenium metal by the method of oxidising the nitrosylruthenium complex to the soluble ruthenate anion ($RuO_4^{-2}$) and the majority of the base and platinum metals present to an insoluble state;

removing any solids by filtration;
reducing the ruthenate anion to the insoluble dioxide using a suitable alcohol, such as ethyl alcohol;
removing the insoluble dioxide from solution by filtration; and
removing entrained impurities from the ruthenium dioxide using a suitable wash and then reducing the ruthenium dioxide to ruthenium metal.

Further according to this aspect of the invention the alkali solution is a sodium hydroxide solution, the oxidation step is effected using sodium bromate and the alcohol is ethyl alcohol.

The preferred general procedure is as follows:

1. A solution, from which gold, platinum and palladium have been removed, is concentrated and rediluted with water to give a free hydrochloric acid concentration of about 0.5M. If the separation of platinum and palladium has been achieved using the amino acid solvent as described in our co-pending patent application Ser. No. 806,816, entitled SEPARATION AND PURIFICATION OF PLATINUM AND PALLADIUM this will already have been achieved.

2. If osmium is present in solution, it is removed by adding nitric acid and boiling the solution to remove osmium tetroxide. The distilled osmium tetroxide may be condensed and recovered by conventional techniques e.g. reduction with alcoholic sodium hydroxide, followed by acidification with hydrochloric acid and finally precipitation of $(NH_4)_2OsCl_6$ by addition of ammonium chloride.

3. Once the osmium has been removed from solution the ruthenium may be converted to the nitrosylruthenium complex as follows:
    (a) A suitable reductant, e.g. formic acid or formaldehyde is added in 50% excess of the stoichiometric quantity required for the following reductions:

$$Ru^{IV} + \text{red.} \rightarrow Ru^{II}; \text{ and,} \quad (i)$$

$$HNO_3 + \text{red.} \rightarrow NO^+ + H_2O \quad (ii)$$

Thus when formic acid is used as the reductant the stoichiometrics are:

$$Ru^{IV} + HCOOH \rightarrow Ru^{II} + H_2O + CO_2 \quad (i)$$

$$HNO_2 + 1\ HCOOH + H^+ \rightarrow NO^+ + 1\ CO_2 \quad (ii)$$

and the stoichmetric requirement is 2 moles of formic acid per mole of ruthenium.

(b) The solution is then heated to about 80° C and a 50% excess of nitric acid over that indicated by the stoichiometry of equation (ii) is slowly added over a time period of about 1 hour. An exothermic reaction takes place and is allowed to proceed without heating for 2 hours. At the end of this period, the solution is then heated to complete the reaction and drive off excess reaction products, especially nitrogen oxides.

4. At this stage the ruthenium will be totally converted to nitrosylruthenium, but a series of such complexes will exist probably consisting of mixed aquo-chloronitro species. Inevitably the rhodium and iridium will also be present as a number of mixed complexes and iridium additionally will be present mainly in $Ir^{IV}$ oxidation state. The solution must be treated further to destroy these complexes. It has been found that by boiling the solution after acidification with HCl, preferably to at least 6N, the nitrosylruthenium and the rhodium and iridium may be converted to the chlorocomplexes. Additionally, a reductant capable of reducing $Ir^{IV}$ to $Ir^{III}$ may be added. $SO_2$ is a convenient reductant for this purpose.

Thus, at the end of the procedure the predominant platinum group metal species in solution are:
    $RuNOCl_5^{2-}$
    $IrCl_6^{3-}$ together with some $IrCl_x(H_2O)_y{-}(x-3)$
        where $x + y = 6$, and
    $RhCl_6^{3-}$ together with some $Rh\ Cl_x(H_2O)_y{-}(x-3)$
        where $x + y = 6$.

Because of the differences in charge on the anions for the nitrosylruthenium complex on the one hand, and the rhodium and iridium chlorocomplexes on the other hand, large differences in behaviour towards anion exchangers may now be obtained.

Liquid anion exchangers are preferred where large quantities of ruthenium are to be handled and ruthenium metal of high purity is required.

If however, the ruthenium is presently only as a contaminant in a rhodium-iridium solution, for example, resin anion exchangers may be successfully used to remove the ruthenium contaminant, and to produce an eluate which is highly enriched in ruthenium. Two solvent extraction systems have been investigated in detail and have proved satisfactory in pilot plant tests. The systems, and their characteristics are as follows:

1. Tertiary amine system

The use of commercial tertiary amines has been investigated. A suitable reagent is a trailkyl amine such as Alamine 310 (Alamine being a product of General Mills Inc.), diluted 20% v/v or less in Solvesso 150 (Solvesso being an Esso Chemical product). This solvent extractant has a high capacity for nitrosylruthenium chloride (approximately 25 g/l) and a high distribution coefficient. Selectivity is good but stripping cannot be easily accomplished using hydrochloric acid.

Stripping is effectively accomplished, however, by contacting the organic phase with sufficient alkali solution so that the pH, after contacting, of the aqueous phase is sufficiently alkaline to keep the ruthenium complex soluble. In practice, when organic phase is 20% Alamine it is sufficient to use 1 equivalent of alkali per liter of solvent stripped. Thus, when a 10% (2.5N) solution of Sodium Hydroxide is employed as strippant this can be used at an organic/aqueous ratio of 3/1.

The advantage of this method over other possible methods are:
    (i) stripping is complete in one contact, and the process is thus very easy to operate.
    (ii) the strip solution so obtained lends itself to simple processing for final purification and precipitation of pure ruthenium dioxide.

This purification process consists of the following steps:
    a. the hot strip solution is treated with sodium bromate to convert the nitrosylruthenium complex to the soluble ruthenate anion $RuO_4^{2-}$. The oxidation process renders insoluble most base metals and other platinum metals, and these may be removed from the solution by filtration.
    b. the purified solution is then treated with alcohol in sufficient quantity to reduce the ruthenium to the insoluble dioxide, which is recovered by filtration.
    c. the ruthenium dioxide is washed with dilute acid to free it of entrained impurities, mainly sodium, and then reduced with hydrogen at an elevated temperature to produce pure ruthenium metal.

Alternatively, a perchloric acid strip technique has been developed. In this technique the loaded solvent is contacted with an aqueous solution containing a slight excess of the amount of perchlorate anions indicated in the following exchange reaction:

$$(ClO_4^-)_{aq} + {}_{(R_3NH^+)_2}RuNOCl_5{}^{2-}{}_{org} \rightarrow$$
$$2R_3NH^+ClO_4^- + RuNOCl_5{}^{2-}{}_{aq}$$

The perchlorate is almost completely transferred into the organic phase while ruthenium is transferred to the aqueous phase. Perchlorate anions are then removed from the organic phase by contacting the stripped solvent with an alkaline solution preferably sodium hydroxide, whilst the amine is converted to the free base and sodium perchlorate is formed according to the following reaction:

$$R_3NH^+ClO_4^- + NaOH_{aq} \rightarrow R_3N + H_2O + Na_{aq}^+ + ClO_4^-{}_{aq}$$

Thus an aqueous solution of perchlorate anions is regenerated which may be re-used in the strip stage after acidification with HCl. Preferably the strip solution should be at least 0.1M in HCl. Recycle of the perchlorate will, of course, introduce sodium ions into the strip liquor but this does not have any great deletrious effect on the purity of the ruthenium produced.

It has been found that washing of the loaded solvent prior to stripping increases the ruthenium purity. The wash solution is conveniently 0.5N $H_2SO_4$ or $HNO_3$. Such wash solutions are highly effective in removing co-extracted base metals such as iron and copper.

2. Tri-n-butyl phosphate system (TBP)

Tributyle phosphate is a very weak base solvent. It has fairly low distribution coefficient for ruthenium but concentrated solutions of the reagent can be used. A 50% solution of TBP is Solvesso 150 (Solvesso is a product of Esso Chemicals) has been found to be suitable for use in this application. Because of the low distribution coefficient many stages are required if high loadings in the organic phase are to be achieved. Although loadings of up to 40 g/l of ruthenium have been achieved in continuous operation, a much lower loading of about 15 g/l is a more easily attainable figure in practice.

Washing of the loaded solvent is beneficial in this case as in the amine system and a wash solution of 6M HCl is preferred.

The advantage of this system over the amine system is that stripping is easily and simply accomplished using weak HCl (0.5–0.1M) as the strippant. Nitrosylruthenium tends to form a weak complex with TBP under acid concentrations of less than 0.1M HCl so that strip concentrations less than this should be avoided. The distribution coefficient of ruthenium in weak acid solutions is very low so that concentrated strip solutions may be achieved in a few stages.

The use of resins for the removal of small concentrations of nitrosylruthenium from solutions containing much greater concentrations of rhodium and iridium has also been investigated. Both strong base and weak base (quartenary and tertiary amine) resins have been found to be successful. The selectivity of the resins is, of course, not nearly as great as equivalent solvents but a large measure of concentration of ruthenium on the resin with respect to the other two platinum group metals may be obtained.

It has been found that the loaded resins may be stripped by the following technique:
1. the loaded resin is washed free of excess with water;
2. a saturated solution of $SO_2$ is passed through the resin. The pink colour of the resin beads fades as reaction occurs with the formation of the sulphito complexes of RuNo,Rh(111) and Ir(111);
3. these complexes may now be effectively removed from the resin by elution with hydrochloric acid, preferably in the concentration range 2M–6M.

The platinum group metal complexes in the eluate are mixed chloro-sulphito species. These may readily be converted into full chloro-complexes by boiling the solution and thus a suitable solution for separation of Ru from Rh and Ir by solvent extraction is obtained.

EXAMPLE 1

The feedstock used in this experiment was an intermediate solution from a platinum metals refinery containing a high proportion of the secondary platinum group metals. This had been obtained from a concentrate by treating it to obtain a hydrochloric acid solution of the platinum group metals, and further treated to remove gold, the bulk of the silver, Pt and Pd by methods which are not described here. The solution at this stage contained the following:

| Ru | 36 g/l |
|---|---|
| Rh | 9.8 g/l |
| Ir | 3.2 g/l |
| Os | 2.6 g/l |
| Cu, Fe, Ni, Pb | all between 500 ppm and 1000 ppm. |
| Ag | 50 ppm |
| Pt, Pd, Au | less than 1 ppm |

This solution was oxidised with nitric acid and the osmium distilled off until the level in solution had dropped to less than 20 ppm. The ruthenium was then converted to the nitrosylruthenium chloride as described above and the solution reduced with $SO_2$ to reduce Ir(IV) to Ir(III). Fifty liters of solution were then passed through a pulsed packed solvent extraction column using 20% Alamine 310 in Solvesso 150 as the extractant at a ratio O/A = 2/1. The barren solution was analysed and found to contain less than 5ppm Ru. The loaded organic was then washed as described and stripped with 1,5 M perchloric acid in 6 M HCl at an organic/aqueous ratio 2/1. The strip solution was analysed for the metals in the feed solution with the following results:

| Ru | 35,2 | g/l |
|---|---|---|
| Rh | 10 | ppm |
| Ir | 13 | ppm |
| Os | 15 | ppm |
| Cu | 50 | ppm |
| Fe, Ni, Pb, | N.D. | (N.D. means not detected) |
| Ag | 5 | ppm |

It will be appreciated that production of substantially pure ruthenium metal from such a solution can easily be achieved. A convenient and simple method of recovering the ruthenium from such a solution is precipitation of the slightly soluble ammonium chloride to the strip solution in known manner. The salt can then be calcined to produce ruthenium metal sponge. An example of metal produced in this way had a purity of greater than 99,8 of Ru, the main impurities being Rh, Ir and Os.

EXAMPLE 2

This example illustrates the use of the TBP solvent extraction system. A similar experiment to that in Example 1 was performed on a slightly different feed stock. After Au, Ag, Pt, Pd and Os removal this solution had the following analysis:

| Ru | 45 g/l |
|---|---|
| Rh | 17 g/l |
| Ir | 4,5 g/l |
| Fe | 3,7 g/l |
| Cu | 2,6 g/l |
| Te | 1,8 g/l |
| Ni | 1,2 g/l |
| Pb | 600 ppm |

The solution was treated to convert the ruthenium to the nitrosylruthenium chloride complex and reduced as described above. The solution was then fed to the solvent extraction columns using TBP (50% in Solvesso) as the extractant at an organic to aqueous phase ratio of 3:1. Because of the lower distribution coefficient for TBP as compared with that of Alamine, extraction was not efficient in this case as compared with the previous example and the barren solution contained 100 ppm Ru.

The loaded organic was washed as described above and stripped with 0.2M HCl. The strip solution was concentrated to a small volume and analysed with the following results:

| Ru | 125 g/l |
|---|---|
| Rh | 15 ppm |
| Ir | 60 ppm |
| Cu | 7,5 g/l |
| Fe | 11,5 g/l |
| Te | 5,5 g/l |
| Ni, Pb | N.D. |

Thus while selectivity against Rh and Ir was very good, almost complete co-extraction of Fe, Cu, and Te was experienced. These elements did not however, seriously affect the purity of the ruthenium ultimately produced. This was done in a manner similar to that in the previous experiment but the first salt precipitated was redissolved in hot water and re-precipitated to avoid contamination by base metal chlorides. This salt was then calcined and the metal so produced analysed spectrographically. Only Ir was found to be present in significant quantities and was present in a concentration of 400 ppm. Ruthenium of purity 99.93% was produced by the process.

EXAMPLE 3

This example illustrates the use of ion-exchange resins for removing small concentrations of nitrosylruthenium from solutions containing a much greater concentration of rhodium and iridium. Such solutions could arise from circumstances such as those found in Example 2 after initial removal of ruthenium.

A solution containing:

| Ru | 120 ppm |
|---|---|
| Rh | 17,3 g/l |
| Ir | 2,7 g/l | was used in this example. An ion exchange column containing 5 liters of Amberlite XE-299, a macro-reticular, weak base resin was used in the test. (Amberlite is the registered Trade Mark of Rohm & Haas). Approximately 120 liters of solution was passed through the resin at a flow rate of 2 ml/cm²/min. The barren solution was analysed and found to contain:

| Ru | 5 ppm |
|---|---|
| Rh | 17,1 g/l |
| Ir | 2,6 g/l |

The column was then washed and eluted with $SO_2$-water and 6M HCl as described above. 5 Bed volumes of HCl were necessary to elute the column of Ru, Rh, and Ir. This solution was concentrated to give a solution containing:

| Ru | 1,4 g/l |
|---|---|
| Rh | 2,5 g/l |
| Ir | 230 ppm |

This solution is thus suitable for recycle to the solvent extraction stage. A batch solvent extraction test was performed and this revealed that all of the ruthenium was in an extractable form.

EXAMPLE 4

This example illustrates the use of a hydroxide solution for stripping the extractant:

A 20% solution of Alamine as used to extract nitrosylruthenium chloride from a plant solution containing:

| Ru | 50,000 ppm |
|---|---|
| Rh | 23,000 ppm |
| Ir | 8,500 ppm |
| Pt | 50 ppm |
| Pd | 10 ppm |
| Fe | 1,500 ppm |
| Cu | 2,500 ppm |
| Pb | 350 ppm |

The loaded organic was then washed with a 0.5N solution of nitric acid to remove as much co-extruded iron and copper as possible. The loaded, washed organic was then analysed and found to contain:

| Ru | 15,500 ppm |
|---|---|
| Rh | 110 ppm |
| Ir | 135 ppm |
| Pt | 16 ppm |
| Pd | 3 ppm |
| Fe | 200 ppm |
| Cu | 120 ppm |

This organic was then stripped at a 3/1 ratio with 100 g/l sodium hydroxide solution. The strip solution was then treated as outlined above to produce, finally $RuO_2$. This was washed and reduced to metal as described above and the metal analysed for the impurities present by spectrographic analysis, with the following results:

| Pt | 70 ppm |
|---|---|
| Ir | 40 ppm |
| Rh | 5 ppm |
| Pd | Not detectable |
| Fe | Not detectable |
| Pb | 45 ppm |
| Cu | 30 ppm |

The analysed purity of the ruthenium was 99,97% calcium and silica being the only impurities present in significant amounts other than those mentioned above.

What we claim as new and desire to secure by Letters Patent is:

1. A process for the recovery of ruthenium from solutions thereof which are substantially free from platinum, palladium and gold said process comprising the successive steps of:
   (1) boiling the solution together with an oxidant to cause any osmium present to be driven off as osmium tetroxide in the vapor phase;
   (2) treating the resulting solution with a reducing agent in the presence of nitric acid to form a solution containing a nitrosylruthenium complex;
   (3) adding hydrochloric acid to the solution containing the nitrosylruthenium complex to form the chlorocomplexes of the ruthenium and any iridium and rhodium present;
   (4) reducing any iridium present in the resultant chloroplex-containing solution to reduce Ir(IV) to Ir(III);
   (5) contacting the resulting solution with an anion exchanger in the solid or liquid form transferring the nitrosylruthenium chlorocomplex onto the anion exchanger;
   (6) contacting the anion exchanger with a solution to extract the nitrosylruthenium chloro-complex from the anion exchanger into said solution; and
   (7) recovering the ruthenium from the solution resulting from step (6) above.

2. A process as claimed in claim 1 in which the solution of step (3) is heated.

3. A process as claimed in claim 1 in which the reducing agent of step (2) is formic acid or formaldehyde.

4. A process as claimed in claim 1 in which the ruthenium chlorocomplex formed in step (4) is of the form $RuNOCl_5^{-2}$.

5. A process as claimed in claim 1 in which the iridium chlorocomplex formed in step (4) is of the form $IrCl_6^{-3}$.

6. A process as claimed in claim 1 in which the rhodium chlorocomplex formed in step (4) is of the form $RhCl_6^{-3}$.

7. A process as claimed in claim 1 in which a liquid anion exchanger in the form of a tertiary amine is used in step (5).

8. A process as claimed in claim 7 in which the anion exchanger is contacted with an alkali solution at a pH which maintains the ruthenium complex in solution.

9. A process as claimed in claim 8 in which the alkali solution is a 10% sodium hydroxide solution.

10. A process in which the ruthenium is recovered from the solution of claim 25 by the additional steps of:
   (8) oxidizing the nitrosylruthenium complex to form the soluble ruthenate anion ($RuO_4^{-2}$); whereby the majority of the base metals, rhodium and iridium present are converted to an insoluble state;
   (9) removing any solids by filtration to yield a filtrate;
   (10) reducing the soluble ruthenate anion in the filtrate of step (9) to form insoluble ruthenium dioxide;
   (11) removing the insoluble dioxide from the solution of step (10) by filtration;
   (12) washing the ruthenium dioxide to remove entrained impurities; and,
   (13) reducing the ruthenium dioxide to ruthenium metal by contacting it with hydrogen at an elevated temperature.

11. A process as claimed in claim 10 in which the oxidation step (8) is effected using sodium bromate.

12. A process as claimed in claim 10 in which the reducing agent used in step (10) is ethyl alcohol.

13. A process for the separation and recovery of ruthenium values from a solution containing said ruthenium values and being substantially free from platinum, palladium and gold, said process including the steps of:
   (1) removing any osmium present in said solution by adding nitric acid and boiling said solution causing the osmium present to be driven off as osmium textroxide in the vapor phase;
   (2) converting the ruthenium values present in said solution to the nitrosylruthenium complex by adding an excess of the stoichiometric amount of formic acid or formaldehyde as a reducing agent to convert the ruthenium present to the $Ru^{+2}$ oxidation state and heating the resulting solution in the presence of nitric acid until substantially all of the ruthenium is converted to the nitrosylruthenium complex;
   (3) adding hydrochloric acid to the solution resulting from step (2) and heating, thereby forming the chlorocomplexes of the ruthenium $RuNOCl_5^2$ and also the chlorocomplexes of rhodium $RhCl_6^{3-}$ and iridium $IrCl_6^{3-}$, when present;
   (4) contacting the chlorocomplex-containing solution of step (3) with an anion exchange material which material selectively removes the nitrosylruthenium chlorocomplex from the solution;
   (5) extracting and removing the nitrosylruthenium chlorocomplex from the anion exchange material with an extraction solution; and
   (6) recovering the ruthenium from the extraction solution resulting from step (5).

14. A process for the separation and recovery of ruthenium values from a solution containing said ruthenium values and being substantially free from platinum, palladium and gold, said process including the steps of:
   (1) removing any osmium present in said solution by adding nitric acid and boiling said solution causing the osmium present to be driven off as osmium tetroxide in the vapor phase;
   (2) converting the ruthenium values present in said solution to the nitrosylruthenium complex by adding an excess of a stoichiometric amount of a reducing agent to convert the ruthenium present to the $Ru^{+2}$ oxidation state and heating the resulting solution in the presence of nitric acid until substantially all of the ruthenium is converted to the nitrosylruthenium complex;
   (3) adding hydrochloric acid to the solution resulting from step (2) and heating thereby forming the chlorocomplexes of the ruthenium $RuNOCl_5^{2-}$ and also the chlorocomplexes of rhodium $RhCl_6^{3-}$ and iridium $IrCl_6^{3-}$ when present;
   (4) contacting the chlorocomplex-containing solution of step (3) with an anion exchange material which material selectively removes the nitrosylruthenium chlorocomplex from the solution;
   (5) extracting and removing the nitrosylruthenium chloroplex from the anion exchange material with an extraction solution;
   (6) recovering the ruthenium from the extraction solution resulting from step (5);
   (7) oxidizing the nitrosylruthenium complex contained in the extraction solution to form the soluble ruthenate anion ($RuO_4^{-2}$) and consequently converting a majority of any base metals, rhodium and iridium present to an insoluble state;
   (8) removing the solids from the solution of step (b) to form a filtrate;

(9) reducing the soluble ruthenate anion in the filtrate to form insoluble ruthenium dioxide;

(10) removing the insoluble ruthenium dioxide from the solution of step (9) by filtration;

(11) washing the recovered ruthenium dioxide to remove entrained impurities; and

(12) reducing the ruthenium dioxide to ruthenium metal.

* * * * *